US008458648B2

(12) United States Patent  (10) Patent No.: US 8,458,648 B2
Dangeville et al.  (45) Date of Patent: Jun. 4, 2013

(54) GRAPHICAL MODELIZATION OF USER INTERFACES FOR DATA INTENSIVE APPLICATIONS

(75) Inventors: Nicolas Dangeville, Paris (FR); Thierry Matusiak, Lieusaint (FR)

(73) Assignee: International Business Machines Corporation, Armonk, NY (US)

(*) Notice: Subject to any disclaimer, the term of this patent is extended or adjusted under 35 U.S.C. 154(b) by 1218 days.

(21) Appl. No.: 12/326,614

(22) Filed: Dec. 2, 2008

(65) Prior Publication Data

US 2009/0235229 A1 Sep. 17, 2009

(30) Foreign Application Priority Data

Dec. 10, 2007 (EP) .................................. 07301652

(51) Int. Cl.
*G06F 9/44* (2006.01)
(52) U.S. Cl.
USPC ........................................................ 717/105
(58) Field of Classification Search
USPC ........................................................ 717/105
See application file for complete search history.

(56) References Cited

U.S. PATENT DOCUMENTS

| | | | |
|---|---|---|---|
| 5,892,903 A | 4/1999 | Klaus et al. | |
| 5,905,859 A | 5/1999 | Holloway et al. | |
| 5,991,881 A | 11/1999 | Conklin et al. | |
| 6,018,627 A | 1/2000 | Iyengar et al. | |
| 6,199,195 B1 | 3/2001 | Goodwin et al. | |
| 6,230,309 B1 * | 5/2001 | Turner et al. | 717/107 |
| 6,349,404 B1 | 2/2002 | Moore et al. | |
| 6,442,694 B1 | 8/2002 | Bergman et al. | |
| 6,550,054 B1 | 4/2003 | Stefaniak | |
| 6,654,882 B1 | 11/2003 | Froutan et al. | |
| 6,711,127 B1 | 3/2004 | Gorman et al. | |
| 6,715,083 B1 | 3/2004 | Tovander et al. | |
| 6,721,890 B1 | 4/2004 | Shrikhande et al. | |
| 6,725,377 B1 | 4/2004 | Kouznetsov et al. | |
| 6,745,333 B1 | 6/2004 | Thomsen et al. | |
| 6,792,546 B1 | 9/2004 | Shanklin et al. | |

(Continued)

FOREIGN PATENT DOCUMENTS

WO    WO2006043012    4/2006

OTHER PUBLICATIONS

Gornik, "UML Data Modeling Profile", May 2002, IBM.*

(Continued)

*Primary Examiner* — Wei Zhen
*Assistant Examiner* — Junchun Wu
(74) *Attorney, Agent, or Firm* — Yee & Assocaties, P.C.; David A. Mims

(57) ABSTRACT

A method, computer program product and system for creating class diagrams of user interfaces of applications. A modeling language such as UML V2.0 may be used to create class diagrams through a graphical editor, create new model elements derived from existing ones such as stereotypes for creating a comprehensive class diagram for the user interface. The class diagram for the user interface is based on a limited number of stereotyped classes for pages, views in the pages of the user interface, operations in the view classes and class for services triggered by the operations. The user interface class diagram is attached to the application class through the classes of the application for data manipulated by the user interface. A sequence diagram reflecting the correlation between view operation and services is also created to complete the description of the user interface.

9 Claims, 9 Drawing Sheets

U.S. PATENT DOCUMENTS

| | | | |
|---|---|---|---|
| 6,895,432 B2 | 5/2005 | Ando et al. | |
| 6,931,623 B2 | 8/2005 | Vermiere et al. | |
| 6,968,535 B2 | 11/2005 | Stelting et al. | |
| 6,981,158 B1 | 12/2005 | Sanchez et al. | |
| 7,000,219 B2 | 2/2006 | Barrett et al. | |
| 7,020,784 B2 | 3/2006 | Raphaeli et al. | |
| 7,047,518 B2* | 5/2006 | Little et al. | 717/108 |
| 7,093,290 B2 | 8/2006 | Han et al. | |
| 7,219,328 B2* | 5/2007 | Schloegel et al. | 717/104 |
| 7,275,096 B2 | 9/2007 | Green | |
| 7,543,268 B2 | 6/2009 | Cherdron et al. | |
| 7,620,958 B2 | 11/2009 | Carrell et al. | |
| 7,684,902 B2 | 3/2010 | Igoe | |
| 7,840,935 B2 | 11/2010 | Fildebrandt et al. | |
| 7,979,840 B2 | 7/2011 | Zhang et al. | |
| 7,992,134 B2 | 8/2011 | Hinchey et al. | |
| 8,005,788 B2 | 8/2011 | Leroux et al. | |
| 8,082,538 B2 | 12/2011 | Hinchey et al. | |
| 8,086,994 B2 | 12/2011 | O'Connell et al. | |
| 8,140,320 B2 | 3/2012 | Dangeville et al. | |
| 2002/0078202 A1 | 6/2002 | Ando et al. | |
| 2002/0104068 A1 | 8/2002 | Barrett et al. | |
| 2003/0167404 A1 | 9/2003 | Han et al. | |
| 2003/0212778 A1* | 11/2003 | Collomb | 709/223 |
| 2003/0227482 A1* | 12/2003 | Bach et al. | 345/762 |
| 2004/0001092 A1* | 1/2004 | Rothwein et al. | 345/763 |
| 2004/0044990 A1 | 3/2004 | Schloegel et al. | |
| 2004/0103307 A1 | 5/2004 | Raphaeli et al. | |
| 2005/0256665 A1 | 11/2005 | Hartmann et al. | |
| 2005/0273763 A1 | 12/2005 | Bendsen et al. | |
| 2006/0004845 A1 | 1/2006 | Kristiansen et al. | |
| 2006/0112399 A1 | 5/2006 | Lessly | |
| 2006/0120353 A1* | 6/2006 | Farrell et al. | 370/352 |
| 2007/0089103 A1* | 4/2007 | Iborra et al. | 717/104 |
| 2007/0094638 A1* | 4/2007 | DeAngelis et al. | 717/107 |
| 2007/0198968 A1 | 8/2007 | Shenfield et al. | |
| 2007/0277151 A1* | 11/2007 | Brunel et al. | 717/113 |
| 2008/0082959 A1* | 4/2008 | Fowler | 717/104 |
| 2008/0163159 A1 | 7/2008 | Oara et al. | |
| 2009/0241088 A1 | 9/2009 | Dangeville et al. | |
| 2010/0088667 A1 | 4/2010 | Dangeville et al. | |
| 2010/0325603 A1* | 12/2010 | Hussey | 717/104 |
| 2012/0150526 A1 | 6/2012 | Dangeville et al. | |

OTHER PUBLICATIONS

Bernhard, "UML Class Diagrams Revisited in the Context of Agent-Based Systems", 2002, pp. 101-118, Springer-Verlang.*

Medvidovic et al., "Modeling Software Architectures in the Unified Modeling Language", Jan. 2002, pp. 2-57, ACM.*

Kollmann et al., "Capturing Dynamic Program Behaviour with UML Collaboration Diagrams", 2001, IEEE.*

Tim Schattkowsky and Marc Lohmann, "UML Model Mappings for Platform Independent User Interface Design" presented at the MoDELS 2005 Workshops, (http://wwwcs.uni-paderborn.de/cs/ag-engels/Papers/2006/ModelMappingsforPlatformIndependent InterfaceDesign-LNCS-Version.pdf) t.

Kai Blanckenhorn, "A UML Profile for GUI Layout" from the Master's Thesis, dated May 23, 2004, (http://www.bitfolge.de/pubs/thesis/Thesis_GUILayout.pdf).

Nicolas Dangeville, et al., Method and System to Modelize Resources and External Data of a Program for Procedural Language Coding, filed Oct. 8, 2008, U.S. Appl. No. 12/247,339, IBM Corporation.

Stefan Sarstedt, "Model Driven Development with Active Charts Tutorial", p. 24 section 4.3.3, http://www.stefansarstedt.com/Publications/13250.218,UIB_2006-01.pdf.

Pan-Wei Ng, Automated Modeling of Legacy Systems Using the UML, Http://www.ibm.com/developerworks/rational/library/content/RationalEdge/sep02/AutomatedSep02.pdf.

Viviane Torres da Silva, et al., "Using the UML 2.0 Activity Diagram to Model Agent Plans and Actions", http://www.cs.huji.ac.il/course/2005/aisernin/articles2006/docs/pa5a4_594.pdf.

IBM, "Describing the program resources and linkage data," retrieved from http://publib.ibm.com/infocenter/ratdevz/v8r0/index.jsp?topic=/com.ibm.etools.umlx.cobol.doc/tasks/zapg020.html, print date Jul. 19, 2011 orignal date unknown, 4 pages.

Dangeville, et al., "Creating Graphical Models Representing Control Flow of a Program Manipulating Data Resources," filed Jun. 4, 2012, U.S. Appl. No. 13/487,504, IBM Corporation, 27 pages.

Hennicker, et al., "Modeling the User Interface of Web Applicaitons with UML," retrieved on Aug. 22, 2012 from http://www.pstinformatik.uni-muenchen.de/~kochn/pUML2001-Hen-Koch.pdf, 15 pages.

Da Silva, et al., "User Interface Modelling with UML," retrieved on Aug. 22, 2012 from http://www.ksl.stanford.edu/people/pp/papers/PinheirodaSilva_IMKB_2000.pdf, 15 pages.

Stone, Ron, "JPMorgan Raises the Bar for Banking Applications," retrieved on Aug. 22, 2012 from http://www.eclipse.org/community/casestudies/jp_morgan_final.pdf, 5 pages.

* cited by examiner

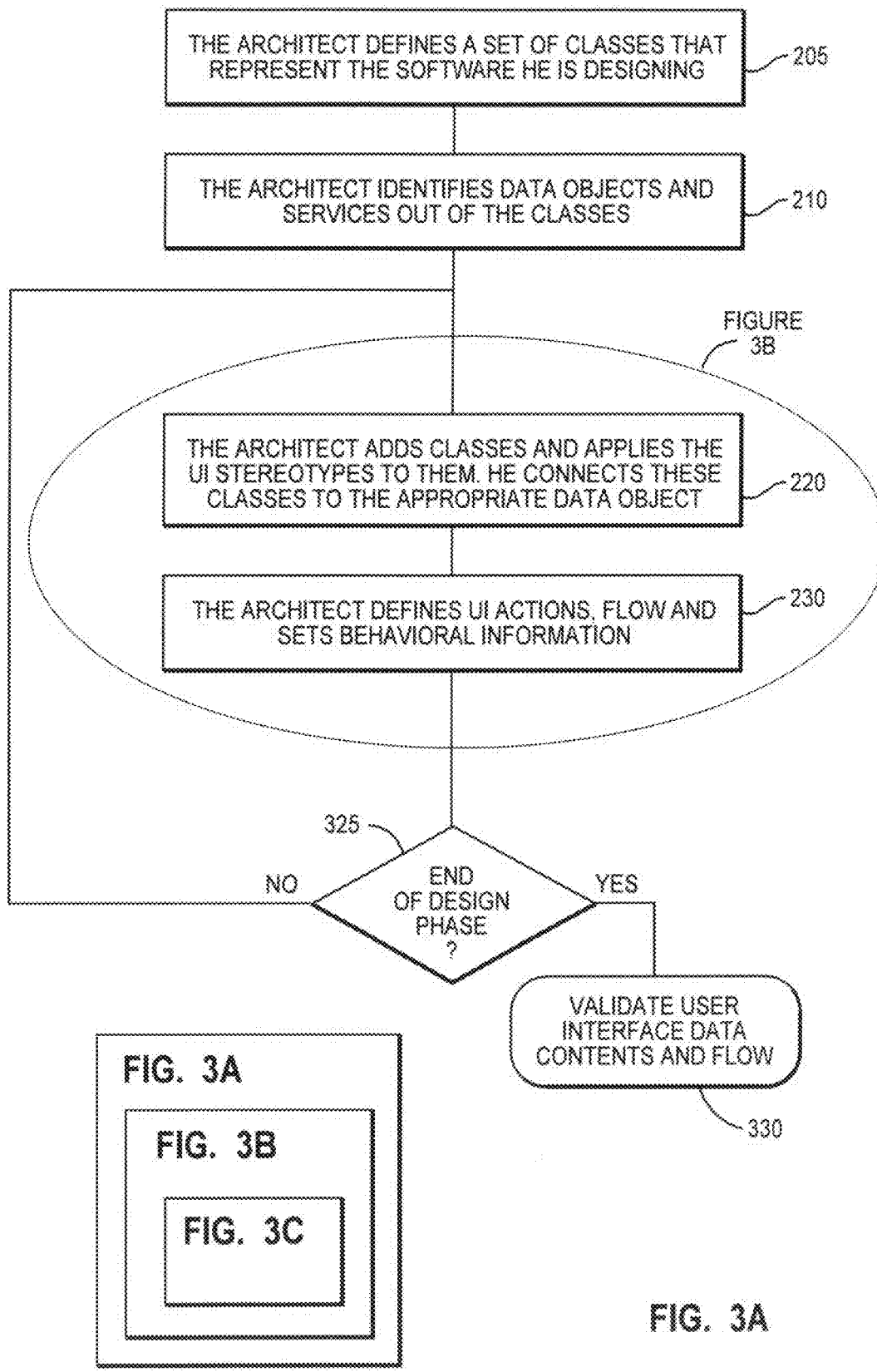

GRAPHICAL MODELIZATION OF USER INTERFACES FOR DATA INTENSIVE APPLICATIONS

CROSS REFERENCE TO RELATED APPLICATIONS

This application claims priority to French Foreign Patent Application No. 07301652.9 entitled "A METHOD AND SYSTEM TO PROVIDE GRAPHICAL MODELIZATION OF USER INTERFACES FOR DATA INTENSIVE APPLICATIONS", filed on Dec. 10, 2007, and claiming the same priority date, which is incorporated herein by reference and assigned to the assignee herein.

FIELD OF THE INVENTION

The present invention generally relates to software development; more particularly, the invention aims at representing a user interface using graphical modelization.

BACKGROUND

Graphical modelization of applications using, for instance Unified Modeling Language (UML) is a complete part of the development process for modern applications. Most applications today are described at a higher level of abstractions in UML, for example through class diagrams, and then derived in actual code. UML is commonly used to conduct design reviews early in the process of software development. One example of typical applications with user interface is a Web application which provides the actual presentation of a user interface with Web pages and the control of user interaction flows. In the Web application there is an interaction between the user with the databases and other kinds of system services, through standard Internet technologies, including Web browsers and HTTP which is all about user interfaces.

However, user interfaces today are not well taken into account with the standard UML processes, although they represent a significant piece of the software to develop and thus need to go through the same design reviews as the rest of the other components.

The US patent application US20060004845 assigned to Microsoft corporation proposes to automate the production of the user-interface of an application by defining a set of maps that will be applied to the UML class diagram and used to generate the actual UI.
The maps described here are external to the UML model. So the User Interface is not a part of the model itself but some additional process, that involves external, non-UML descriptions are involved in order to produce the user interface code. Thus it is not possible with US20060004845 to design at a high level the user interface along with the system and manipulate both of them in the same representation, namely UML.

There is thus a need in today's application design to represent user interfaces in UML and have these user interface artifacts to connect gracefully with the other artifacts rather than be disruptive and involve a completely separate definition. With this goal achieved, a user can expect to obtain the same benefits from the user-interface artifacts as they get from the other artifacts of their software thanks to UML representations.

The first document "UML Model Mappings for Platform Independent User Interface Design" by Tim Schattkowsky1 and Marc Lohmann2 presented at the MODELS 2005 Workshops (http://wwwcs.uni-paderborn.de/cs/ag-engels/Papers/2006/ModelMappingsforPlatformIndependentInterfaceDesign-LNCS-Version.pdf) describes transformations from logical model to user-interface dedicated models. Several transformations are involved from the original logical model in order to describe in details the composition of the user-interface. Although this first document provides a platform independent way to define user-interfaces, the process to do it ends up with several models. The first logical one does not contain any information about user-interface and the next levels contain detailed information about the UI Elements that are then able to be transformed into widgets. This design does not provide a simple, single representation at a high level of abstraction of the user interface and its connection to the logical model. It also involves detailed user-interface constructs.

A second document "A UML Profile for GUI Layout" from the Master's Thesis of Kai Blankenhorn dated May 23, 2004, (http://www.bitfolge.de/pubs/thesis/Thesis_GUILayout-.pdf) provides a set of profiles to describe in details user-interface components in UML. This approach does not provide a way to represent User Interface components at a high level of abstraction which complements the logical model. The representation here is extremely detailed and does not allow an easy connection with the logical model.

Describing the full graphical contents of a user interface in UML is not satisfactory as 1/ there is a lot of work involved in describing the interface, that can be more easily done in a UI composer 2/ the stereotypes provided are not generic. They represent widgets of a given framework (e.g. Java SWING, JSF, etc.).

Mapping UML classes to Domain Specific language does not either provide a way to represent the user interface in UML.

There is thus a need for a tool that would extend the current UML representations and support user interface, describe the user interface at an equivalent level of abstraction as the other artifacts, connect them with the other UML classes. These descriptions would be handled in UML, in a similar fashion as any other class, using the standard UML diagrams.

SUMMARY

It is an object of the invention to represent in a simple, concise and expressive way the aggregated constructs that one deals with when manipulating user interfaces.

This object is achieved, according a sample embodiment of the invention, with a method executed on a computer to provide a graphical object model of a user interface of an application already modelized with an existing class diagram using the graphical editor of a modeling language allowing creation of new types of model elements derived from existing ones, said method comprising:
the user creating new types of model elements:
  a DataObject class type, describing a structure of data manipulated through the user interface;
  three view class types depending from the first class type, SearchView describing data to be searched, ListView describing data to be listed and DetailView describing data content to be detailed through the user interface;
  a Page class type depending on the view class types describing a page of the user interface;
  an ActionTrigger operation type describing an action triggered from a view class type;
  a Service class type describing operations where at least one operation is triggered by an ActionTrigger operation type;

the user applying the DataObject class type to data already described in the existing class diagram, said data being manipulated through the user interface;

the user creating the class diagram of the user interface using the new created types of model elements, said class diagram of the user interface converging to the DataObject classes, the view classes being attached to the DataObject classes and the Page classes being attached to the view classes.

This object is also achieved, according to a sample embodiment of the invention, further comprising, after the step of the user creating new types of model elements:

the user applying the Service class type to the classes already described in the existing class diagram containing one operation to be triggered through the user interface.

This object is also achieved, according a sample embodiment of the invention, further comprising:

graphically representing as a flow diagram:

each operation of the ActionTrigger type of the view classes;

the at least one operation of a class of Service type which is triggered by an operation of ActionTrigger type;

the view classes which are opened depending on the result of the execution of the at least one operation of a class of Service.

This object is also achieved, according to a sample embodiment of the invention, wherein the steps of creating the class diagram of the user interface using the new types of model elements are automatically performed by the computer, the user providing input pattern parameters.

This object is also achieved according to a sample embodiment, wherein the existing class diagram uses the Unified Modeling Language, the steps performed for creation of the new types of model elements use stereotyping of elements in the Unified Modeling Language.

This object is also achieved, according to a sample embodiment of the invention, wherein the flow diagram is a sequence diagram using the Unified Modeling Language.

This object is achieved, according to a sample embodiment of the invention, wherein the step of creating the class diagram of the user interface is automatically performed by the computer executing IBM Rational Software Architect version 6 or 7, the user providing a pattern for each Page class and each ActionTrigger operation.

This object is also achieved, according to a sample embodiment of the invention, with a computer program product comprising programming code instructions for executing the steps of the method to provide a graphical object model of a user interface of an application already modelized with an existing class diagram using the graphical editor of a modeling language allowing creation of new types of model elements derived from existing ones when said program is executed on a computer.

This object is also achieved, according to a sample embodiment of the invention, with a system comprising means adapted for carrying out the method to provide a graphical object model of a user interface of an application already modelized with an existing class diagram using the graphical editor of a modeling language allowing creation of new types of model elements derived from existing ones.

Embodiments of the invention include the following concepts:

Use UML classes to represent user interface components.

Don't use UML artifacts (e.g. class) to represent the details of the UI composition (field by field description). Instead, connect the User Interface components to the Data Definition classes that the UI will display and manipulate Provide Stereotypes for UI composition to represent the 3 main UI data representations: search, list, detail Use stereotyped Operations in the UML classes to represent the action that are triggered from the user interface, capture the flow to the actual operations and to the other UI components through sequence diagrams.

Invoke the UML to User Interface Transforms to create the UI artifacts associated to their DataObjects and operations.

Using a sample embodiment of the invention, we have a simple, high level description of the user interface that is easy to create in UML, modify, and validate without being overcrowded by unnecessary details at this stage of the design. This high level description connects well with the other parts of applications, and can be transformed into more detailed representation or into code once it is valid.

The classes and class operation created and used according to a sample embodiment of the invention are necessary and sufficient to fully modelize a user interface.

Furthermore, with an embodiment of the invention provides the following benefits:

Language independent solution. Further transformation can lead to detailed language dependent/framework dependent descriptions Can represent any type of user interface: Rich UI (windows based), Web UI (e.g. HTML), TUI (green screen UI), etc.

Capture some behavior of the UI (can the list support paging, is the detail for update or read-only purpose, etc.)

Capture flow of user interface in sequence diagram (or alternatively in an activity diagram).

Some steps of the method can be advantageously automated (for example using patterns in IBM Rational Software Architect (RSA) version 6 or 7).

BRIEF DESCRIPTION OF THE DRAWINGS

FIGS. 3A, 3B, and 3C are sample flowcharts of the method according to the preferred embodiment;

DETAILED DESCRIPTION OF THE PREFERRED EMBODIMENT

Figure 1:
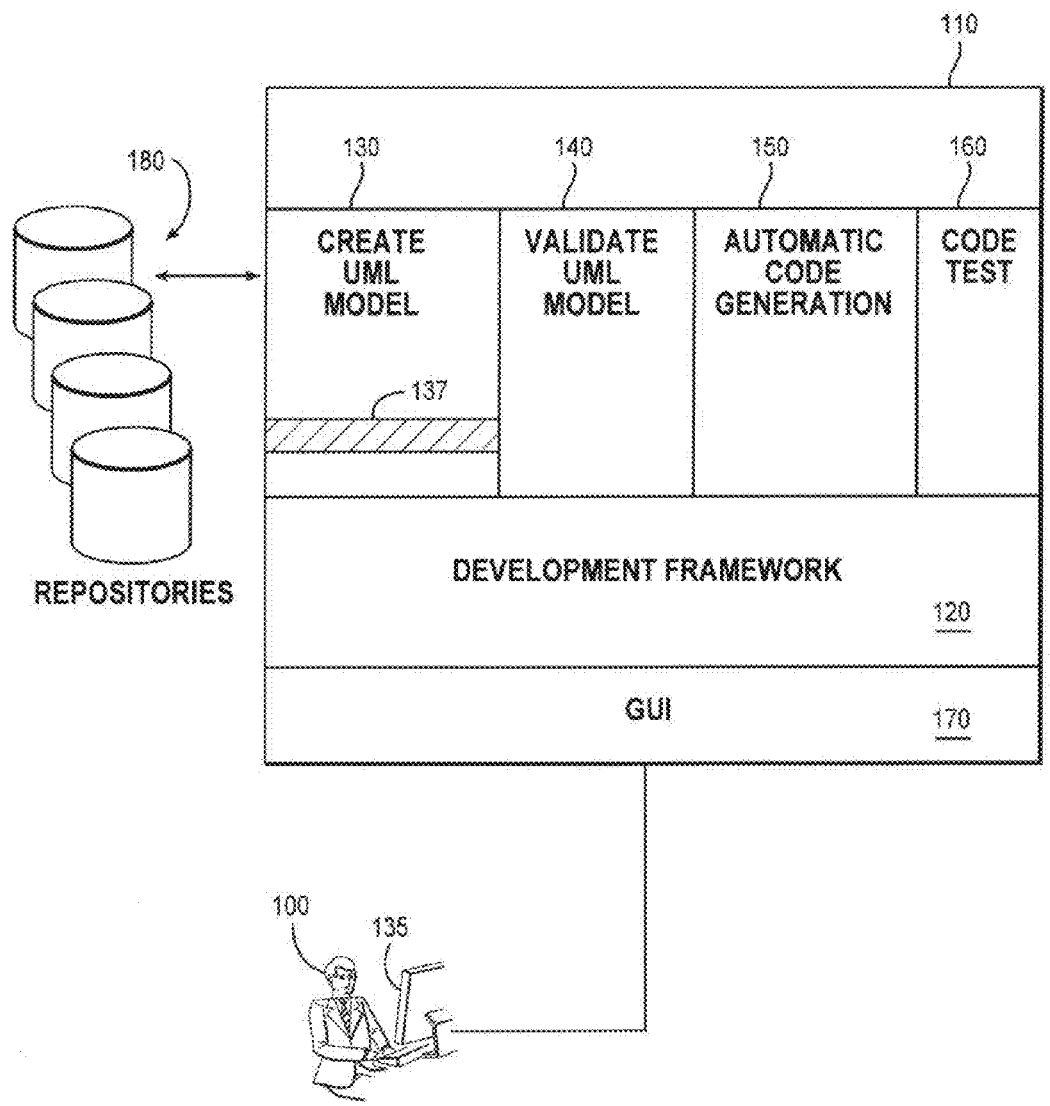
FIG. 1 is a sample system environment of the method of the preferred embodiment.

FIG. 1 illustrates a system environment of using the method of the preferred embodiment. The developer (100) using object oriented programming uses a development framework (120) for designing (130) object models, validating them (140), creating code (150) and testing it (160). Repositories (180) storing model elements, code and other components. are accessed by these different functions of the framework. For modelizing the application UML can be used. A UML class diagram (135) representing the classes and their relationships is displayed on the console of the developer. These classes will be used by the components of the application. With the method of the preferred embodiment, the developer can extend the class diagram to represent the pages and views of the user interface components of a data oriented application. This class diagram will be an extension of the UML model for the other components of the application to be developed. The developer will capture the flow of operations though a flow diagram. The developer will be then able to validate the user interface UML model extension in the same way he validates the rest of the application component UML model. As with the other UML models it will be possible to automatically generate the user interface component code starting from the user interface UML model extension using dedicated automatic code generators.

A new software layer (137) is added to the function allowing creation of user-interface artifacts connected to the object model.

It is noted that it is possible to facilitate creation of User interface UML model extension using design tools: for instance the IBM Rational Software Architect (RSA) Version 6 and 7 patterns can automate the creation of the model by creating the classes corresponding to a pattern provided as input, applying the stereotypes and adding the relationships.

Figure 2:
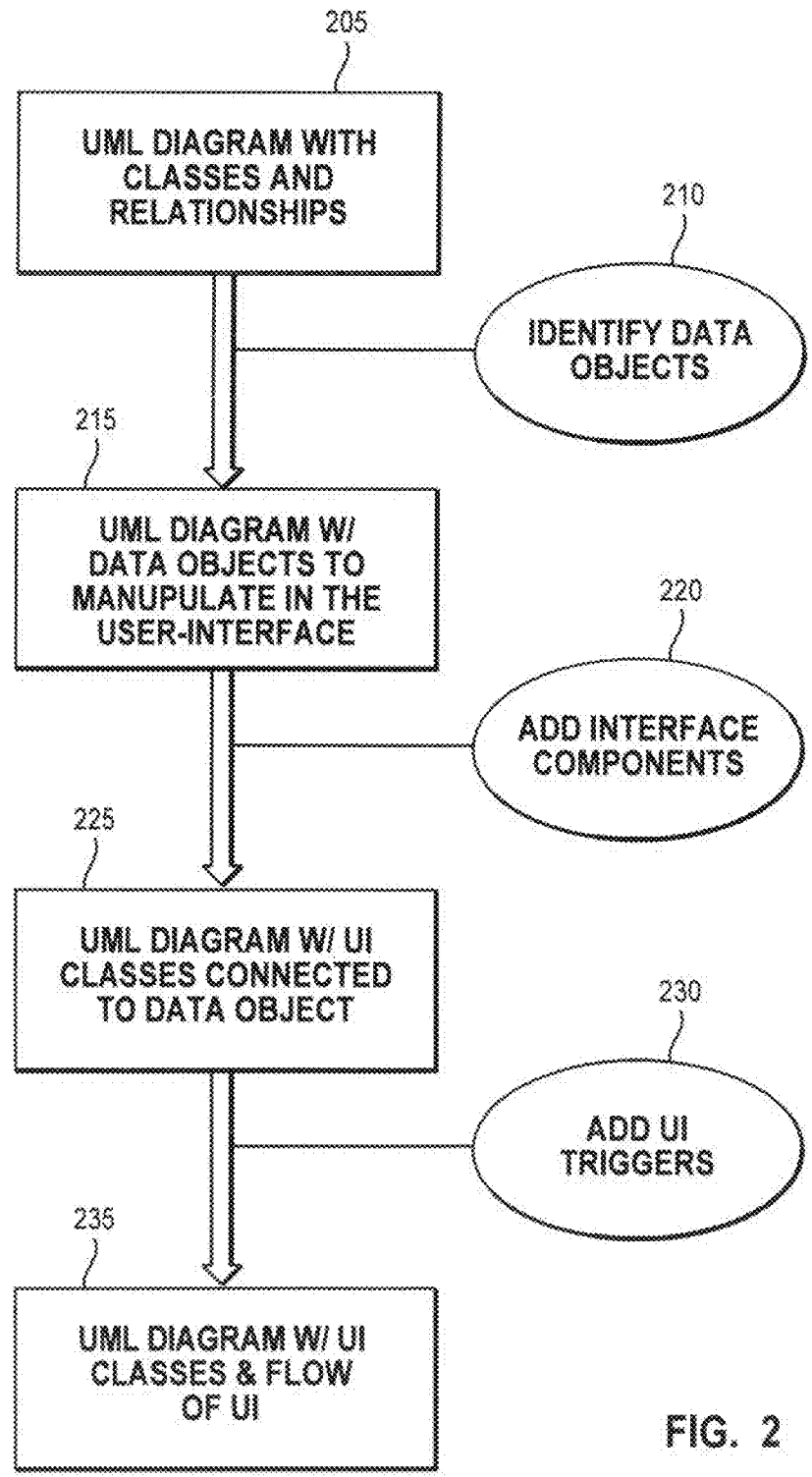
FIG. 2 illustrates a sample data flow generated by the steps of the method according to the preferred embodiment.

FIG. 2 illustrates the data flow generated by the steps of the method according to the preferred embodiment. The input data flow (205) is a UML class diagram which contains all the classes with attributes and operations and also relationships between these classes necessary to develop the application. This UML class diagram is obtained by the architects of the application after executing their design work through the existing graphical tools of the prior art for creating object models.

With UML 2.0, it is possible to define stereotypes and use them in a class diagram. This allows creating new model elements, derived from existing ones, but which have specific properties that are suitable for the problem domain, here the elements in relation with a user interface. One new stereotype is the "DataObject" class defining the structure of a data in the system. One other new stereotype is the so called "Service" class, such a stereotyped class is for describing operations that will be triggered from the user interface. In step 210, an architect identifies among the classes of the UML diagram, the class corresponding to data which will be collected and provided by the application through the user interface. The architect applies to these classes the stereotype DataObject. This step may be performed in an UML 2.0 compliant visual editor. The architect will also identify in this step a class that provides operations that can be triggered from the user interface: this class provides a service. The architect applies to this classes the Service stereotype graphically prefixed in the class diagram with a symbol. Optionally, if the architect does not identify the relevant service class amongst the UML class diagram of the application, he will create new UML classes in the user interface class diagram that define the operations needed to implement the actions to be triggered from the user interface.

Step 215 is the output of step 210. The UML class diagram contains now well identified DataObject and Service classes. These classes are identified in the diagram through the use of the DataObject and Service stereotypes.

Step 220 reflects the action of adding the user interface components to the class diagram, connect them to the DataObject classes and aggregate them. The principle is now, from the DataObject classes which have been identified to extend the model by adding classes depending on these DataObjects. In this way is described an object structure corresponding to the user interface components manipulating and displaying the data of DataObject classes. The architect will create new stereotyped classes which reflect the user interface component. In the preferred embodiment, the new stereotype classes are the view classes which may represent either a list ("ListView"—for example: a list of customers displayed in a table), a detail ("DetailView"—for example: a form to enter the values of the fields that define a customer to create) or a search panel ("SearchView"—for example: the home page of www.Google.com in which you enter a search criteria to get results). In the class diagram, the architect connects these view classes to the DataObject classes. The architect will also add one new stereotyped class, "Page", using the Page Stereotype. Each Page will aggregate one or several views.

Figure 3B:
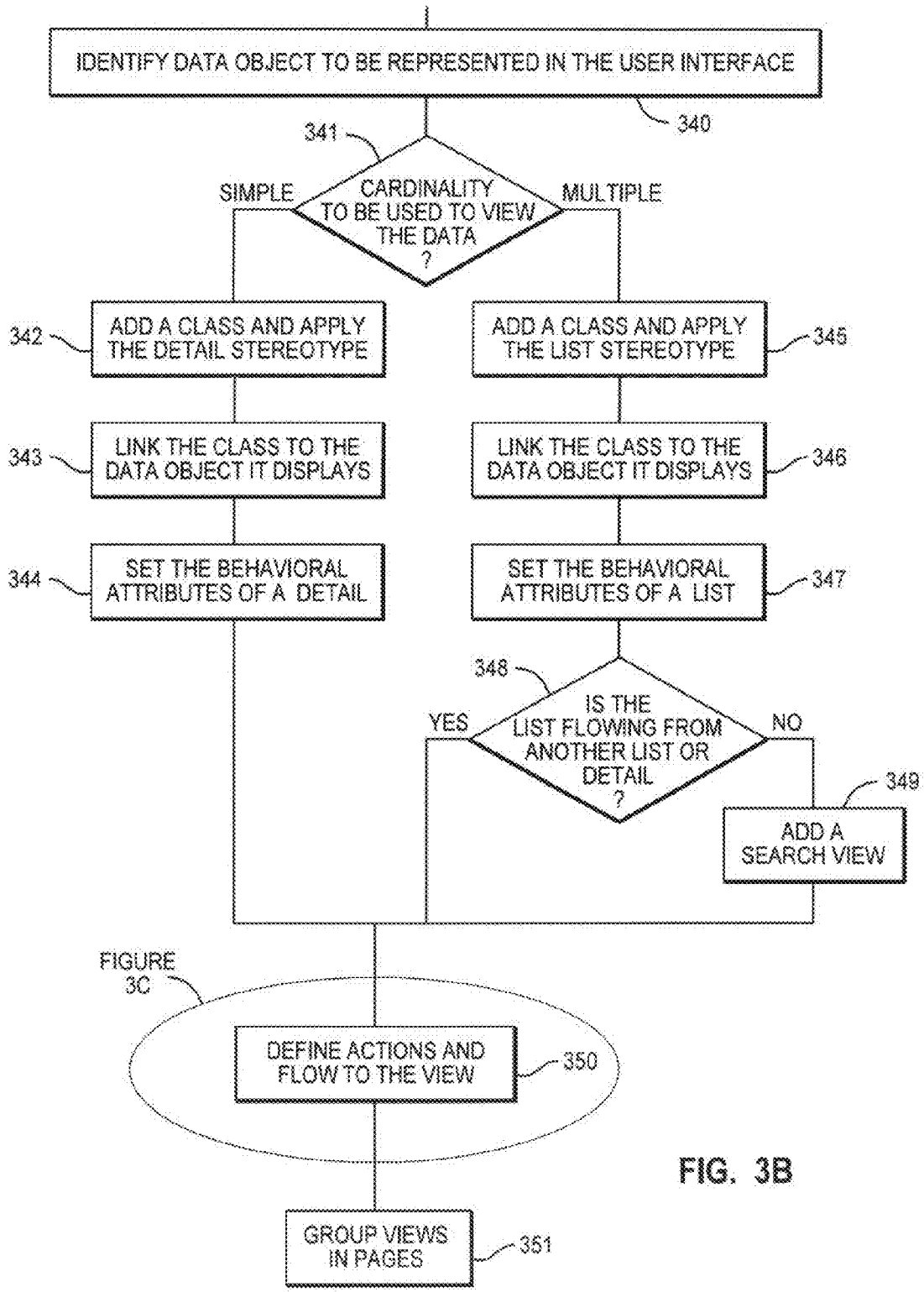
Figure 3C:
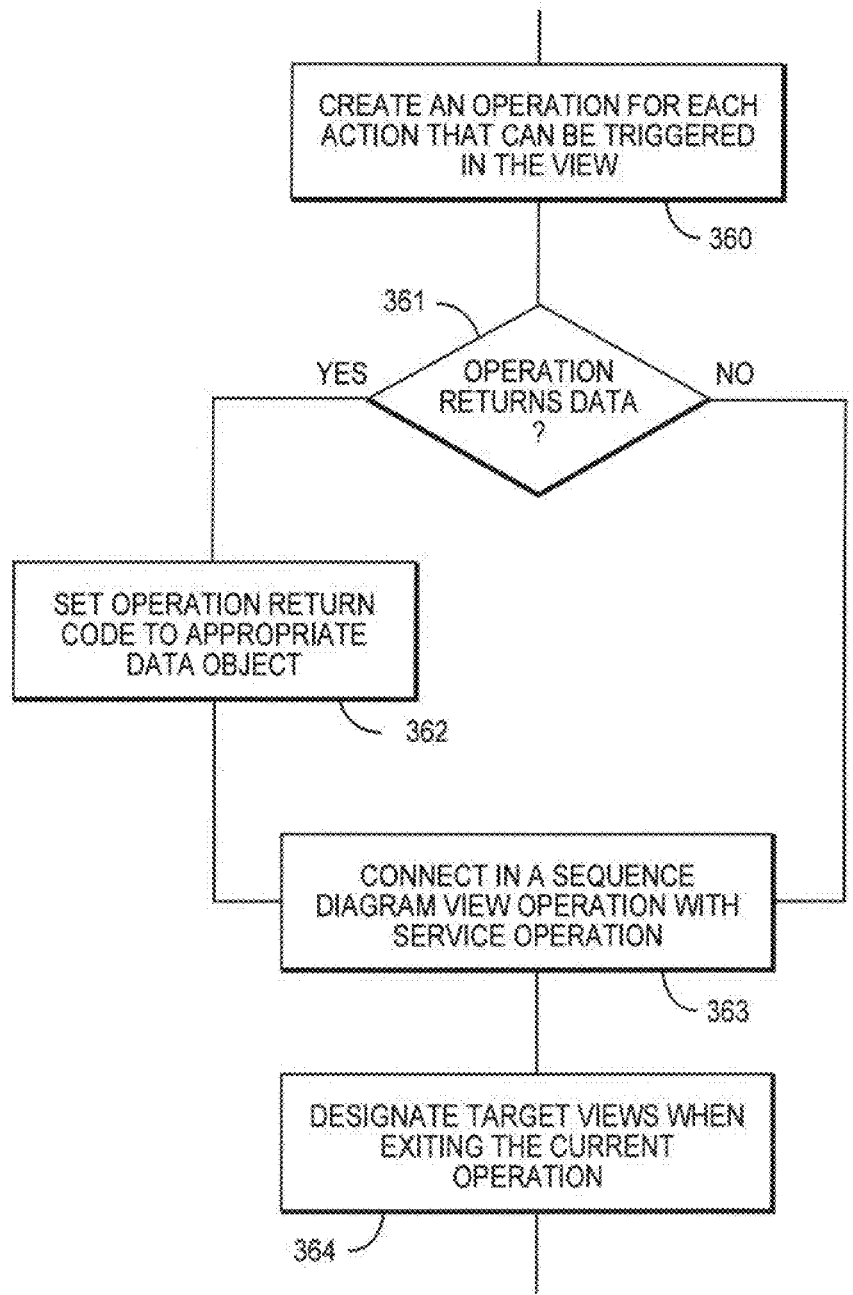

This step is further detailed in reference to FIGS. 3A, 3B and 3C. The step of creation and aggregation of classes is usually performed by an architect in an UML 2.0 compliant visual editor or can be performed with the help of the computer executing IBM Rational Software Architect (RSA) version 6 and 7 patterns as it will be detailed later in this document in reference to FIG. 7.

The UML class diagram (225) which is the output of the actions performed during step 220, comprises well identified DataObjects, newly created Views connected to the DataObjects and Pages that aggregate the Views. We have now obtained a simple description in UML of the layout of the user interface of a system. This description also captures the data that it displays with the linkage to the DataObjects. The DataObjects are themselves part of the original UML system description. This diagram is thus fully consistent with the initial UML class diagram (205) and it is thus an extension of the first one from the DataObjects classes.

Step 230 adds flow information to the user interface layout description. The architect will add UML operations to the Views and stereotype them as "Action Triggers", in order to reflect that this operation is a UI component in the View that triggers some processing (e.g. an hyperlink, a button, a menu item, a pfKey, etc. Applying not only to a Web page but also to a user interface provided by any display device such as an IBM 3270. The signature of the operation will indicate which DataObject is returned (if any) by the operation.

With this new stereotype ActionTrigger applying to the operations, the architect can reflect the needs of the application user for specific actions related to a data in a view.

The architect can also create a sequence diagram that will capture which logical operations are performed by the ActionTrigger, and which target View is open depending on the result(s) of the operation.

This step is usually performed by an architect in an UML 2 compliant visual editor, through a class diagram editor and a sequence diagram editor. As for the execution of step 22, step 330 the creation of new classes in the class diagram can be performed with the help of the computer executing IBM Rational Software Architect (RSA) version 6 and 7 patterns as it will be detailed later in the document in reference to FIG. 7.

Step 235 is the final output of the method. We now have a sequence diagram and a UML class diagram that contains UI descriptions about the layout and the flow. This UI description in UML is fully connected and consistent with the rest of the UML system's description. This UML model extension can be used for reviewing and validating the user interface design. It can be transformed into a target specific UML model that describes details of the user interface for a given framework (e.g. Java Server Pages) and further refined, or directly generated for a given technology (e.g. Java SWING components).

FIGS. 3A, 3B and 3C illustrate a general flowchart of the method according to the preferred embodiment.

Step 305 is the action performed by the architects of the application to obtain a class diagram that represents a software system (205).

As previously described in FIG. 2, step 210 is for Identifying DataObjects and optionally, if they exist, Services; step 220 is the beginning of an iteration phase done by the architect. It consists in adding the user interface components and connect them to the relevant DataObjects. This action is done by adding new classes to the diagram, apply the relevant UI stereotype to the class (ListView, DetailView, SearchView, Page) and connect the View to a DataObject. The architect also adds classes, stereotyped as Pages, and connects these Pages to the views that compose the pages. The output being the class diagram 225. The strength of the preferred embodiment is that with the use of these mere four new stereotypes: ListView, DetailView, SearchView or Page the entire UI can be represented in a very comprehensive way but with a minimum of object model elements thus building a simple class diagram. This overcomes the problem raised by the modelization of user interface of the prior art which is not synthetical but rather looses the designer in the numerous lower level visual object model elements representation such as a huge number of widgets for instance. This is particularly relevant when the application is a data-intensive application.

Step 230 is the next step of the iteration phase. The architect now defines the actions that the user interface will trigger, and their flow. This is done by adding operations (search, edit, open, update) to the Views and apply a new stereotype, the ActionTrigger. From its signature, the result of the Operation identifies the type of DataObject that is returned by the ActionTrigger. A sequence diagram can be described in order to capture the flow of logic that starts from the ActionTrigger: which service operations (if any) are invoked by the ActionTrigger, which view will display the result, what are the possible outputs.

FIGS. 3B and 3C describe the detailed flowchart for the steps 220 and 230.

At the endpoint of the iteration (answer Yes to test 325), the class diagram is completed (235) and the next step will be validating this model with existing techniques which are out of the scope of the invention.

FIG. 3B illustrates in detail the steps 220 and 230 in the general flowchart of FIG. 3A. It describes the process that can be followed to add the UI components to the UML diagram and connect them to the appropriate DataObject The architect first, according to step 210 in the previous figures, considers (340) a given DataObject that should be manipulated in the user interface for instance according to the needs expressed by the application user.

The architect makes a decision based on how the DataObject should be manipulated in the user interface component. What is the number of occurrences that will be displayed? That leads the architect to decide whether to create a ListView (multiple cardinalities) (345) or a DetailView (single cardinalities) (342).

If the architect decides that the DataObject is supposed to be manipulated with a single cardinality in the user interface (answer 'simple' to test 341), he creates a new class, names it and applies the DetailView stereotype to it. Then, he connects (343) the DetailView to the DataObject.

The DetailView stereotype can provide dedicated properties that will further define the behavior of the DetailView. Such properties could indicate, for example, whether the DetailView is to be used for read-only purpose (display only the data of the DataObject) or for editing purpose (provide a form to edit the data of the DataObject). The architect sets the behavior attributes (344) on the properties of the stereotype applied in the class and the class now reflects a representation of a DetailView that manipulates a given DataObject.

If the architect decides that the DataObject is supposed to be manipulated with a multiple cardinality in the user interface (answer 'multiple' to test 341), he creates a new class, names it and applies the ListView stereotype to it (345). Then, he connects (346) the ListView to the DataObject.

The ListView stereotype can provide dedicated properties that will further define the behavior of the ListView. Such properties could indicate, for example, whether the ListView will display all the rows that have been provided or will display only one page of the rows. The size of the page can be specified in another property. The architect updates the behavioral attributes (347) according to the needs of the application user. The architect has now obtained a representation that describes a ListView that manipulates a given DataObject.

The architect can now decide if the list will be populated from an action triggered from another ListView or DetailView (answer Yes to test 348) or if the list will be populated from a dedicated search panel (answer No to test 349).

If the architect decides that the list should be populated from a search panel (answer No to test 349), then he adds a class, applies the SearchView stereotype on it and connects the SearchView to the DataObject that captures the search criteria (349).

The View, its connection to a DataObject and some of its behavior are now defined. This step (350) adds flow information to the view. The user will add UML operations to the Views and stereotype them as ActionTriggers in order to represent UI trigger elements such as hyper-link, button, menu-item, pfKey, etc. that the View contains. The signature of the operation will indicate which DataObject (if any) is returned by the ActionTrigger. A sequence diagram will capture which logical operations are performed by the ActionTrigger, and which target View is open depending on the result(s) of the operations. This step (350) is detailed in FIG. 3C.

When one or several Views are defined, the architect can group one or more Views in a single page (351). To do that, he will create a new class, apply the page stereotype and link the page to the views that it contains. For example: a page could contain a ListView and a DetailView that reference the same DataObject.

FIG. 3C illustrates the detailed flowchart describing step 350 of FIG. 3B for defining actions and flow of the view. The architect has to define the ActionTriggers and the flow of the user interfaces.

The architect represents the triggers (that can be represented in the final UI as either hyperlinks, buttons, menu items or functional keys) in a given view. The architect creates an UML operation in the View class and applies the ActionTrigger stereotype on it (360).

The architect now decides if an ActionTrigger may return new data or just provide navigation to another view. If an action of ActionTrigger returns data (answer Yes to test 361), then, the architect sets the return code in the signature of the action to the appropriate DataObject (362).

The action is now defined in the layout of the view. To express in UML the flow of the user interface the ActionTriggers components are used to start a piece of flow. This flow can be expressed through a sequence diagram, which starts by the ActionTrigger of the view being invoked and describes if one or several Service operations are triggered and which target views are opened. Similarly, in one other embodiment an "activity diagram" known from prior art can be used. The activity diagram is a different representation of the operations executed in the user interface.

Figure 4:
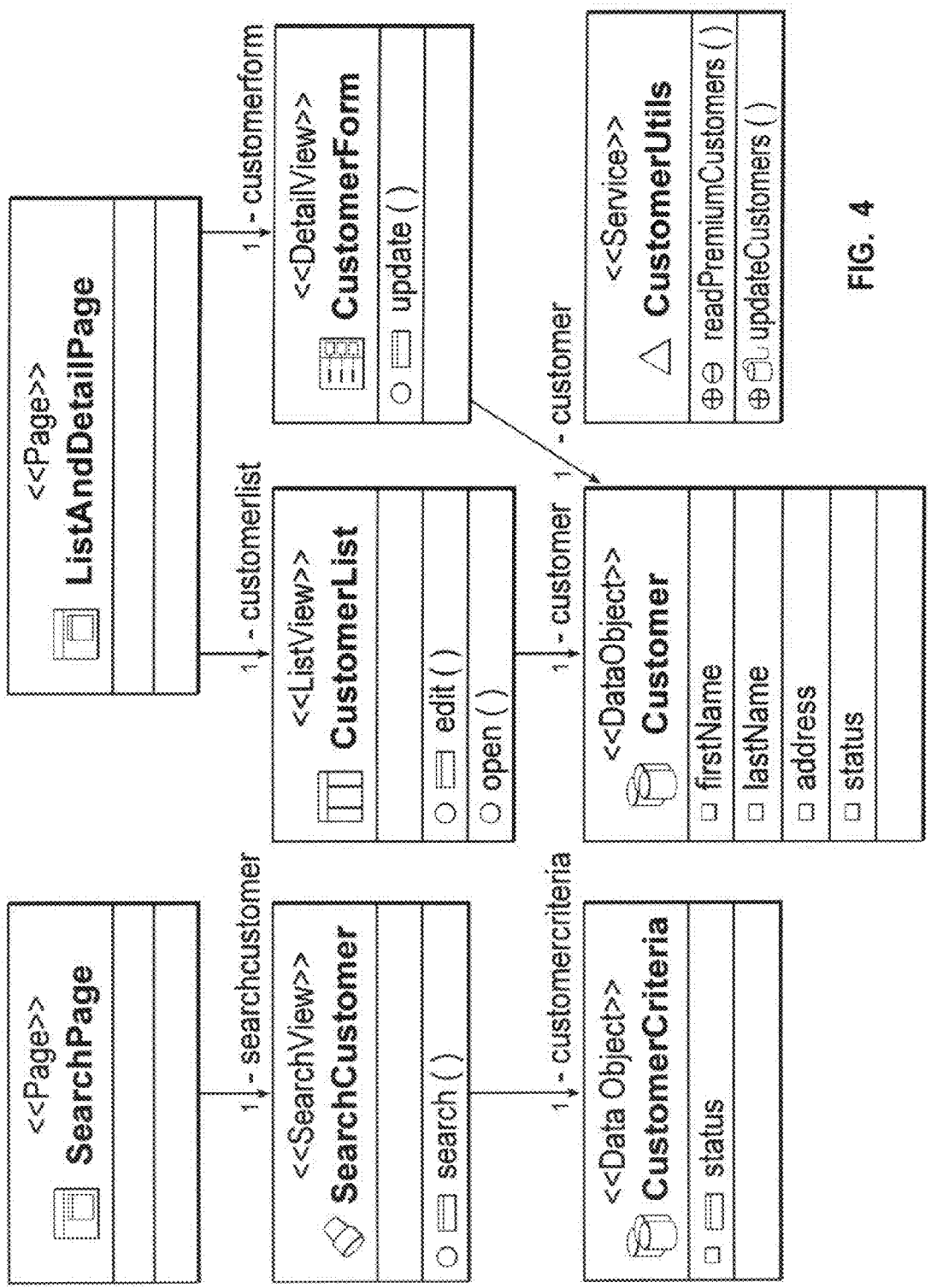
FIG. 4 illustrates an enriched UML diagram including a modelization of the user interface resulting from the execution of the method according to the preferred embodiment.

FIG. 4 illustrates the enriched UML diagram including a modelization of the user interface resulting from the execution of the method of the preferred embodiment. The class diagram contains one DataObject Customer. 2 views are manipulating this DataObject: a ListView "CustomerList" and a DetailView: "CustomerForm". These 2 views are displayed on the same Page: "ListAndDetailPage". A SearchView is also defined in a SearchPage and connects to the "CustomerCriteria" DataObject.

SearchCustomer, CustomerList and CustomerForm contain stereotyped operations that represent ActionTriggers. These ActionTriggers can be triggered from the view.

CustomerUtils has also been identified as a provider of logical operations (service class) that will be triggered from the user interface.

This diagram describes in a simple way the definition and contents of the UI.

Figure 5:
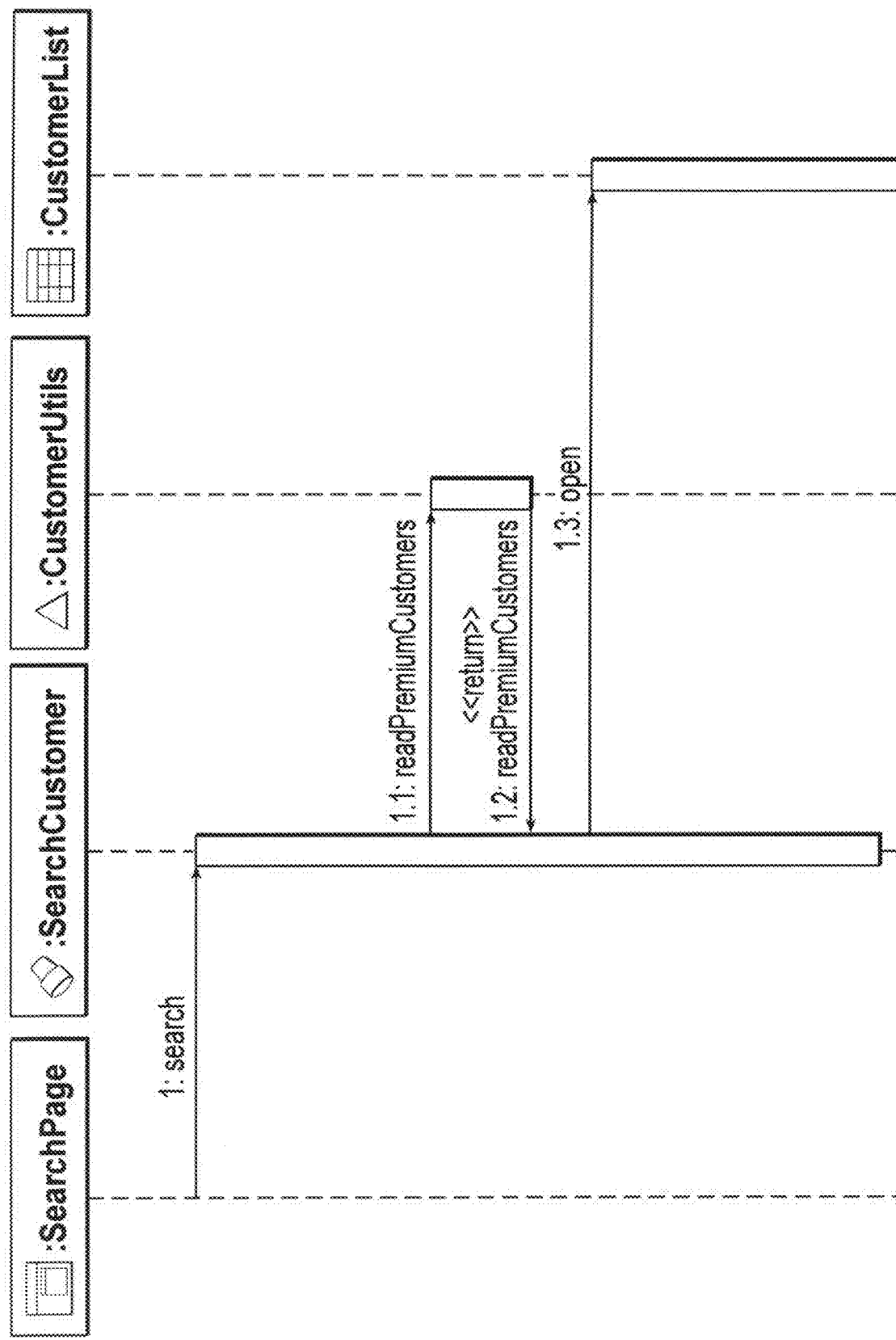
FIG. 5 is the sample diagram of sequence of simulated operations based on the enriched UML diagram of FIG. 4.

FIG. 5 illustrates the sequence of simulated operations based on the enriched UML diagram of FIG. 4. The sequence diagram illustrates the actions that are taken when the search operation is triggered in the searchView. It will first use the readPremiumCustomers operation of the CustomerUtils class and will then open the CustomerList view. Note that the signature of the search operation states that it returns Customer DataObject.

The sequence diagram used in FIG. 5 expresses the flow of the user interface and describes what is performed when an ActionTrigger is used.

The sequence diagram can be performed using a UML V2 editor such as IBM Rational Software Architect version 6 or 7.

Tools, such as IBM Rational Software Architect in version 6 and 7 proposes the concept of patterns that let you automate the creation or update of models. Patterns are instanciated by the architect with a set of input parameters. The tool performs some processing based on these inputs that can, for example, create new classes, apply stereotypes, create relationships, etc. This tool automates steps 220 and 230 for populating the extended UML class diagram with the components corresponding to the description of a user interface.

It is possible to automate the creation of user-interface components by providing RSA patterns that take DataObject as one of its input and will create the necessary classes, apply the appropriate stereotypes in order to create a page, its contained search/list/detail views and connect them to a DataObject.

Figure 6:
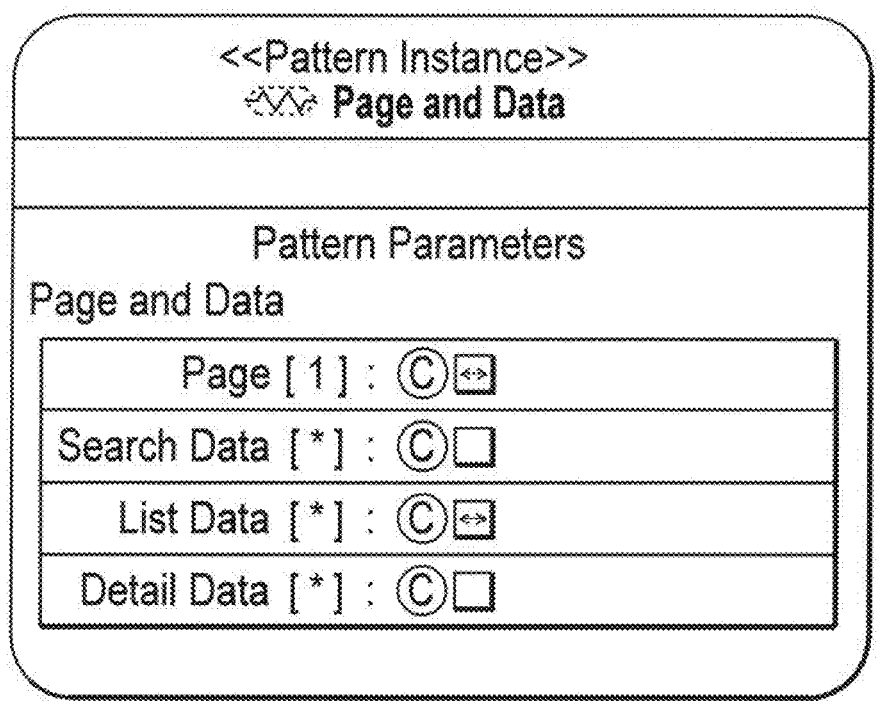
FIG. 6 describes a sample pattern that automates the creation of user interface classes in steps 220 and 230 of the method according to the preferred embodiment.

FIG. 6 describes a sample pattern that automates the creation of user interface classes in order to describe a page, its views and their connections to DataObjects using a tool for automatically generating classes and relationships such as IBM Rational Software Architect (RSA) Version 6 and 7. This sample pattern has 4 parameters:

"Page" is mandatory and unique. It is the name of the page to create

"Search data" is optional. It is the DataObject class to use in a SearchView. Several Data Objects can be specified and thus several searchViews will be created.

"List data" is optional. It is the DataObject class to use in a ListView. Several DataObjects can be specified and thus several listViews will be created.

"Detail data" is optional. it is the DataObject class to use in a DetailView. Several DataObjects can be specified and thus several DetailViews will be created.

This pattern is provided as input to the IBM Rational Software Architect program product which, when executed, creates an extension of the initial UML model comprising a page with its views connected to the appropriate DataObjects.

Figure 7:
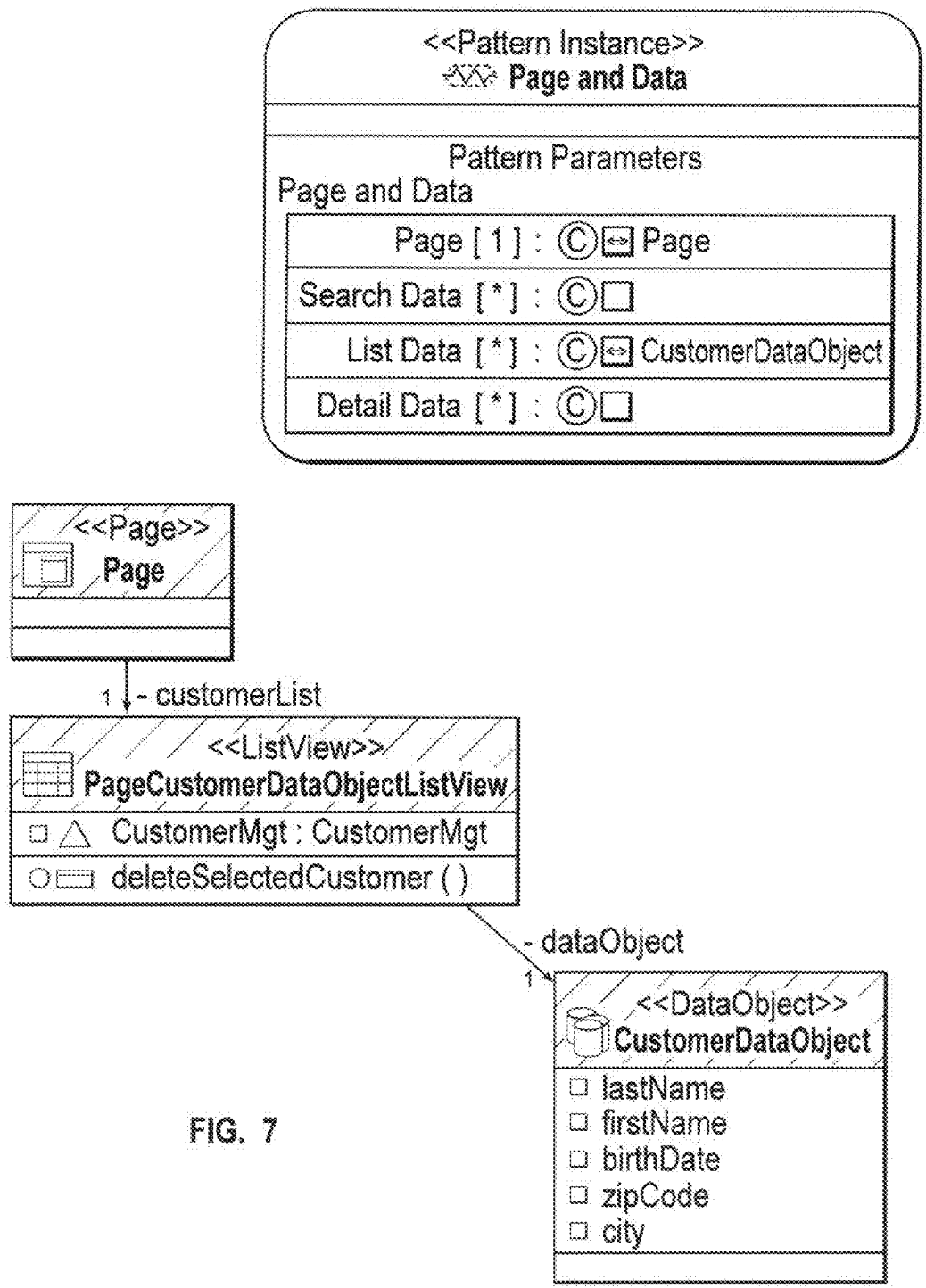
FIG. 7 shows a section of class diagram created from a pattern of a user interface class according to the preferred embodiment.

FIG. 7 shows a section of class diagram created from the pattern as described in FIG. 6 according to the preferred embodiment.

Assuming that only the CustomerDataObject existed in the extension of the initial class diagram before the pattern was applied and that the pattern parameters are:
Page: is given Page
List data: is given CustomerDataObject.
The result of applying the pattern is the creation of:
a class called "Page", with the "Page" stereotype applied.
a class called "PageCustomerDataObjectListView", named after the page and the DataObject, with the "ListView" stereotype applied.
a relationship between the page and the ListView to indicate that the list belongs to the page.
a relationship between the listView and the DataObject to indicate that the list manipulated the DataObject.

While this is simple example, more sophisticated examples may involve several DataObjects and also SearchViews and DetailViews could be given for automating creation components of the extended class diagram from DataObject according to the preferred embodiment, using tools such as IBM Rational Software Architect version 6 and 7.

Similarly, IBM Rational Software Architect Version 6 or 7 pattern can be used to automate the creation of an ActionTrigger and its associated flow from a few parameters. It will generate classes and relationships and flow data. Such a pattern has 3 parameters:

"View" is mandatory and unique. This is the view that will contain the ActionTrigger to be created by the pattern.

"Service Operation" is mandatory and unique. It is the service operation that will be triggered in the flow by the ActionTrigger. The Pattern will create by default an ActionTrigger in the view class named after the service Operation.

"Target View" is optional and unique. This is the target view that the ActionTrigger will open once the Service Operation is performed. If no target is specified, then the implied target view is the current view (ie. The "view" parameter).
This pattern will create the ActionTrigger in the View class. Several strategies can be applied to define the default flow:
Reference the Service class from the view class and name the ActionTrigger after the Service Operation. Then, by convention, the generators can assume that the ActionTrigger will call the service Operation of the same name in all the Services referenced by the view class.
Generate an Activity diagram that defines explicitly the flow of the ActionTrigger.
Generate a Sequence Diagram similar to FIG. 5. The public API for such a creation is not available yet in RSA.

A RSA pattern can also be used to create the Service class and its Operation for a given topology of operations: For example, CRUD (Create, Read, Update, Delete and Select) operations can automatically be created in a Service knowing the Service Class and the DataObject to manipulate. It is unnecessary however to create a pattern just for the purpose of identifying an existing service: such a pattern would only apply the Service stereotype to the class, an elementary task that is as easily performed directly in the UML editor itself.

Any other computer program than IBM Rational Software Architect Version 6 or 7, allowing automatic creation of class diagrams starting from a set of basic classes may be used for developing the class diagram of a user interface as taught by the method of the preferred embodiment.

It is noted also that any other modeling language than Unified Modeling Language version 2.0, providing class diagram creation through a graphical editor, allowing creation of new allowing creation of new types of model elements derived from existing ones such as stereotypes can be used for creating the user interface class and class operation types and further applying those types to generate the user interface class diagram according to the preferred embodiment. Any other modeling language than Unified Modeling Language version 2.0 further allowing creation of flow diagrams such as sequence diagrams or activity diagrams of any type can also be used.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method comprising:
   a computer selecting graphical user interface elements for insertion into a model, the model defined using Unified Modeling Language, wherein the graphical user interface elements comprise:
   a DataObject class type, describing a structure of data manipulated through a user interface;
   three view class types depending from a first class type, SearchView describing data to be searched, ListView describing data to be listed and DetailView describing data content to be detailed through the user interface;
   a Page class type depending on the view class types describing a page of the user interface;
   an ActionTrigger operation type describing an action triggered from a view class type;
   a Service class type describing operations where at least one operation is triggered by an ActionTrigger operation type;
   the computer applying the DataObject class type to data already described in an existing class diagram, said data being manipulated through a user interface; and
   the computer creating a class diagram of the user interface using new types of model elements, wherein the Unified Modeling Language includes the new types of model elements to provide a graphical object model of the user interface in the Unified Modeling Language.

2. The method of claim 1 further comprising, after the step of the computer creating new types of model elements:
   the computer applying the Service class type to the classes already described in the existing class diagram containing one operation to be triggered through the user interface.

3. The method of claim 1 further comprising:
   the computer graphically representing as a flow diagram:
      each operation of the ActionTrigger type of the view classes;
      at least one operation of a class of Service type which is triggered by an operation of ActionTrigger type; and
      view classes which are opened depending on a result of an execution of the at least one operation of a class of Service.

4. The method of claim 1, wherein the steps of creating the class diagram of the user interface using the new types of model elements is automatically performed by the computer, the user providing input pattern parameters.

5. The method of claim 1 wherein the existing class diagram uses the Unified Modeling Language, and wherein the steps performed for creation of the new types of model elements use stereotyping of elements in the Unified Modeling Language.

6. The method of claim 5 wherein the flow diagram is a sequence diagram using the Unified Modeling Language.

7. The method of any one of claim 3 wherein the step of creating the class diagram of the user interface is automatically performed by the computer executing IBM Rational Software Architect version 6 or 7, the user providing a pattern for each Page class and each ActionTrigger operation.

8. A non-transitory computer program product comprising:
   one or more computer readable storage mediums;
   computer program instructions stored in at least one computer readable storage medium for selecting graphical user interface elements for insertion into a model, the model defined using Unified Modeling Language, wherein the graphical user interface elements comprise:
   a DataObject class type, describing a structure of data manipulated through the user interface;

three view class types depending from a first class type, SearchView describing data to be searched, ListView describing data to be listed and DetailView describing data content to be detailed through the user interface;

a Page class type depending on the view class types describing a page of the user interface;

an ActionTrigger operation type describing an action triggered from a view class type;

a Service class type describing operations where at least one operation is triggered by an ActionTrigger operation type;

the user computer program instructions stored in at least one computer readable storage medium for applying the DataObject class type to data already described in an existing class diagram, said data being manipulated through a user interface; and computer program instructions stored in at least one computer readable storage medium for creating a class diagram of the user interface using the new created types of model elements, said class diagram of the user interface, wherein the Unified Modeling Language includes the new types of model elements to provide a graphical object model of the user interface in the Unified Modeling Language.

9. A system comprising means
one or more processors, one or more computer readable memories, and one or more computer readable storage mediums;

computer program instructions stored in at least one computer readable storage medium for execution by at least one processor via at least one computer readable memory for selecting graphical user interface elements for insertion into a model, the model defined using Unified Modeling Language, wherein the graphical user interface elements comprise:

a DataObject class type, describing a structure of data manipulated through the user interface;

three view class types depending from a first class type, SearchView describing data to be searched, ListView describing data to be listed and DetailView describing data content to be detailed through the user interface;

a Page class type depending on the view class types describing a page of the user interface;

an ActionTrigger operation type describing an action triggered from a view class type;

a Service class type describing operations where at least one operation is triggered by an ActionTrigger operation type;

computer program instructions stored in at least one computer readable storage medium for execution by at least one processor via at least one computer readable memory for applying the DataObject class type to data already described in the existing class diagram, said data being manipulated through a user interface; and computer program instructions stored in at least one computer readable storage medium for execution by at least one processor via at least one computer readable memory for creating a class diagram of the user interface using new created types of model elements, said class diagram of the user interface, wherein the Unified Modeling Language includes the new types of model elements to provide a graphical object model of the user interface in the Unified Modeling Language.

* * * * *